United States Patent
Liwell et al.

(10) Patent No.: US 11,498,558 B2
(45) Date of Patent: Nov. 15, 2022

(54) METHOD FOR CONTROLLING A HYBRID POWERTRAIN, A HYBRID POWERTRAIN, AND A VEHICLE COMPRISING SUCH A HYBRID POWERTRAIN

(71) Applicant: Scania CV AB, Södertälje (SE)

(72) Inventors: Mats Liwell, Södertälje (SE); Mattias Nilsson, Södertälje (SE); Fredrik Sunden, Hägersten (SE); Afram Kourie, Södertälje (SE)

(73) Assignee: Scania CV AB, Södertälje (SE)

( * ) Notice: Subject to any disclaimer, the term of this patent is extended or adjusted under 35 U.S.C. 154(b) by 94 days.

(21) Appl. No.: 16/085,925

(22) PCT Filed: Mar. 22, 2017

(86) PCT No.: PCT/SE2017/050272
§ 371 (c)(1),
(2) Date: Sep. 17, 2018

(87) PCT Pub. No.: WO2017/164799
PCT Pub. Date: Sep. 28, 2017

(65) Prior Publication Data
US 2019/0100206 A1 Apr. 4, 2019

(30) Foreign Application Priority Data
Mar. 23, 2016 (SE) .................................. 1650388-0

(51) Int. Cl.
*B60W 30/18* (2012.01)
*B60K 6/48* (2007.10)
(Continued)

(52) U.S. Cl.
CPC ....... *B60W 30/18027* (2013.01); *B60K 6/387* (2013.01); *B60K 6/48* (2013.01);
(Continued)

(58) Field of Classification Search
CPC .......... B60W 30/18027; B60W 10/02; B60W 10/06; B60W 10/08; B60W 10/11;
(Continued)

(56) References Cited

U.S. PATENT DOCUMENTS 8,401,750 B2    3/2013  Karlsson
8,504,229 B2 *  8/2013  Sandstrom ............. B60W 10/11
                                                        701/22

(Continued)

FOREIGN PATENT DOCUMENTS

CN    101952621 A    1/2011
CN    102132075 A    7/2011
(Continued)

OTHER PUBLICATIONS

Scania CV AB, International Application No. PCT/SE2017/050272, International Preliminary Report on Patentability, dated Sep. 25, 2018.
(Continued)

*Primary Examiner* — Jess Whittington
*Assistant Examiner* — Terry C Buse
(74) *Attorney, Agent, or Firm* — Moore & Van Allen PLLC; W. Kevin Ransom

(57) ABSTRACT

The present invention relates to a method to control a hybrid powertrain, comprising a combustion engine, an electric machine, a gearbox with input shaft and output shaft, wherein the combustion engine and the electric machine are connected to the input shaft. The method comprises the following steps: a) disconnecting the combustion engine from the input shaft with a coupling device, b) engaging a starting gear in the gearbox, which starting gear is higher than the gear at which the combustion engine's torque at idling speed is able to operate the input shaft, c) generating a torque in the input shaft with the electric machine, d)
(Continued)

accelerating the electric machine, and e) connecting the combustion engine to the input shaft with the coupling device when the electric machine has reached substantially the same rotational speed as the combustion engine. The invention also relates to a hybrid powertrain and a vehicle.

13 Claims, 5 Drawing Sheets

(51) Int. Cl.

| | | |
|---|---|---|
| B60W 10/08 | (2006.01) | |
| B60W 20/30 | (2016.01) | |
| B60W 10/02 | (2006.01) | |
| B60W 20/10 | (2016.01) | |
| B60K 6/387 | (2007.10) | |
| B60K 6/547 | (2007.10) | |
| B60W 10/06 | (2006.01) | |
| B60W 20/40 | (2016.01) | |
| B60W 10/11 | (2012.01) | |
| F02N 11/00 | (2006.01) | |
| F02N 15/02 | (2006.01) | |

(52) U.S. Cl.
CPC ............ *B60K 6/547* (2013.01); *B60W 10/02* (2013.01); *B60W 10/06* (2013.01); *B60W 10/08* (2013.01); *B60W 10/11* (2013.01); *B60W 20/10* (2013.01); *B60W 20/30* (2013.01); *B60W 20/40* (2013.01); *B60K 2006/4825* (2013.01); *B60W 2510/0638* (2013.01); *B60W 2510/081* (2013.01); *B60W 2510/104* (2013.01); *B60W 2510/1015* (2013.01); *B60W 2510/244* (2013.01); *B60W 2710/021* (2013.01); *B60W 2710/082* (2013.01); *B60W 2710/083* (2013.01); *B60W 2710/1005* (2013.01); *B60W 2710/1022* (2013.01); *B60Y 2200/92* (2013.01); *F02N 11/00* (2013.01); *F02N 15/025* (2013.01); *Y02T 10/62* (2013.01)

(58) Field of Classification Search
CPC ...... B60W 20/10; B60W 20/30; B60W 20/40; B60W 2510/0638; B60W 2510/81; B60W 2510/1015; B60W 2510/104; B60W 2510/244; B60W 2710/216; B60W 2710/83; B60W 2710/1005; B60W 2710/1022; B60K 6/387; B60K 6/48; B60K 6/547; B60K 2006/4825; B60Y 2200/92; F02N 11/00; F02N 15/025; Y02T 10/6286

USPC .......................................................... 701/22
See application file for complete search history.

(56) References Cited

U.S. PATENT DOCUMENTS

| | | | | |
|---|---|---|---|---|
| 8,550,947 | B2* | 10/2013 | Kasuya | B60K 6/547 |
| | | | | 475/5 |
| 8,727,925 | B2* | 5/2014 | Kaltenbach | B60W 10/02 |
| | | | | 475/5 |
| 8,838,352 | B2 | 9/2014 | Eriksson et al. | |
| 2010/0274423 | A1* | 10/2010 | Seel | B60W 30/18063 |
| | | | | 903/902 |
| 2011/0087390 | A1 | 4/2011 | Pandit et al. | |
| 2011/0281685 | A1 | 11/2011 | Allgaier et al. | |
| 2012/0130575 | A1 | 5/2012 | Sandstrom et al. | |
| 2013/0184922 | A1 | 7/2013 | Kabe | |
| 2013/0274976 | A1 | 10/2013 | Suzuki | |
| 2014/0046525 | A1 | 2/2014 | Lee et al. | |
| 2014/0288754 | A1 | 9/2014 | Kasuya et al. | |
| 2015/0203102 | A1 | 7/2015 | Pettersson et al. | |
| 2016/0031438 | A1* | 2/2016 | Matsui | B60L 15/2045 |
| | | | | 180/65.23 |
| 2016/0200312 | A1 | 7/2016 | Blasinski | |
| 2018/0319264 | A1* | 11/2018 | Kaltenbach | F16H 3/724 |
| 2018/0362020 | A1* | 12/2018 | Kobler | B60K 6/30 |

FOREIGN PATENT DOCUMENTS

| | | |
|---|---|---|
| CN | 102186709 A | 9/2011 |
| CN | 103068650 A | 4/2013 |
| DE | 112013000216 T5 | 9/2014 |
| DE | 102013013954 A1 | 2/2015 |
| FR | 2777231 A1 | 10/1999 |
| JP | 2004036710 A | 2/2004 |
| WO | 9952729 A1 | 10/1999 |

OTHER PUBLICATIONS

Scania CV AB, Korean Application No. 10-2018-7029520, Office Action, dated Aug. 19, 2019.
Scania CV AB, European Application No. 17770710.6, Extended European Search Report, dated Oct. 16, 2019.
International Search Report for International Patent Application No. PCT/SE2017/050272 dated May 16, 2017.
Written Opinion of the International Searching Authority for International Patent Application No. PCT/SE2017/050272 dated May 16, 2017.
Scania CV AB, Chinese Application No. 201780012323.4, First Office Action, dated Aug. 28, 2020.

* cited by examiner

METHOD FOR CONTROLLING A HYBRID POWERTRAIN, A HYBRID POWERTRAIN, AND A VEHICLE COMPRISING SUCH A HYBRID POWERTRAIN

CROSS-REFERENCE TO RELATED APPLICATION(S)

This application is a National Stage Application (filed under 35 § U.S.C. 371) of PCT/SE2017/050272, filed Mar. 22, 2017 of the same title, which, in turn claims priority to Swedish Application No. 1650388-0 filed Mar. 23, 2016 of the same title; the contents of each of which are hereby incorporated by reference.

FIELD OF THE INVENTION

The present invention relates to a method to control a hybrid powertrain. The invention also relates to a hybrid powertrain and a vehicle which comprises such a hybrid powertrain.

BACKGROUND OF THE INVENTION

A hybrid-driven vehicle is operated by a combustion engine and an electric machine, which interact to deliver the desired output and to, among others, achieve a good fuel economy in the vehicle. The electric machine may also be used to brake the vehicle, wherein the electric machine functions as a generator and thus returns energy to an electric accumulator in the vehicle. The vehicle may also be equipped with a gearbox to distribute power from the combustion engine and the electric machine, and to achieve a suitable gear ratio for the vehicle's driving wheels.

The combustion engine has an optimal operating speed range, which entails that it cannot usually deliver the maximum torque at low engine speed. For this reason, the vehicle must be brought into motion with a low gear, which means that several shift operations must be carried out before the vehicle achieves the desired target speed.

The vehicle must also be brought into motion at low gears to limit wear on the clutch at start-up. The several shift operations that must be carried out before the vehicle reaches the desired target speed also lead to several torque interruptions, adversely affecting the driver's and the passengers' ride comfort.

During the start process, the average speed in the combustion engine is greater compared to operation at a substantially even engine speed, which affects fuel consumption.

Document FR2777231 shows the parallel interaction of an electric motor and a combustion engine in a hybrid powertrain.

Document US2011/0087390 shows how an electric motor and a combustion engine interact in series in a hybrid powertrain. The combustion engine is arranged between the electric motor and the gearbox. The electric motor is directly connected to the combustion engine.

SUMMARY OF THE INVENTION

Despite prior art, there is a need to further develop a hybrid powertrain, in order to allow for a reduced fuel consumption, less wear on the clutch, and an improved ride comfort for the driver and the passengers.

The objective of the present invention is thus to provide a hybrid powertrain, which can allow for a reduced fuel consumption, less wear on the clutch and an improved ride comfort for the driver and the passengers.

This objective is achieved with a method to control a hybrid powertrain according to the enclosed claims.

According to one aspect of the invention, the method to control a hybrid powertrain comprises a combustion engine, an electric machine, a gearbox with an input shaft and an output shaft, wherein the combustion engine and the electric machine are connected to the input shaft, and an electronic control device, which is connected to the combustion engine, the electric machine and the gearbox. The method comprises the steps: a) disconnecting the combustion engine from the input shaft with a coupling device, b) engaging a starting gear in the gearbox, which starting gear is higher than the gear at which the combustion engine's torque at idle speed is able to operate the input shaft, c) generating a torque in the input shaft with the electric machine, d) accelerating the electric machine, and e) connecting the combustion engine to the input shaft with the coupling device when the electric machine has reached substantially the same rotational speed as the combustion engine.

According to the innovative method the combustion engine obtains assistance from the torque generated by the electric machine during the start, in a speed range where the combustion engine has low available torque. To achieve this, the electric machine torque must be available throughout the entire start process.

By engaging a starting gear in the gearbox, which starting gear is higher than the gear at which the combustion engine's torque at idling speed is able to operate the input shaft, and subsequently generating a torque in the input shaft with the electric machine, the vehicle can be started from a standstill, driven forward and accelerated to achieve the desired target speed. During the acceleration to the desired target speed, a smaller number of gear steps in the gearbox will be carried out compared to if the vehicle were to be started in the gear at which the combustion engine's torque is able to operate the input shaft. Thus, the invention provides a hybrid powertrain, which can allow for a lower fuel consumption, less wear on the clutch, and an improved ride comfort for the driver and the passengers, since a smaller number of gear steps will be carried out compared to if the vehicle were to be started in a gear at which the combustion engine's torque at idling speed is able to operate the input shaft.

To be able to complete an electric start with the electric machine and with a high gear engaged, there is a control function to determine the amount of energy available in the energy storage device. This means that it is possible to ensure that the start is carried out solely with the electric machine. The investigation is carried out by estimating the energy required to bring the vehicle, with a certain acceleration, to the speed where the combustion engine may take over the operation of the vehicle from the electric machine.

If there is an insufficient amount of energy in the energy storage device, a lower starting gear is selected. This ensures that as high a starting gear as possible may be used, allowing for a full electric start with the electric machine. It is therefore possible to calculate the highest gear that can be used at the start with only the electric machine, or if the combustion engine must be connected wholly or partly to add torque to the input shaft in the gearbox together with the electric machine.

The method according to the invention entails improved drivability of the vehicle, since a wider speed range area can be used. As a result, the powertrain may deliver the required torque at a low engine speed in the combustion engine, which leads to a reduced fuel consumption.

It is therefore possible to bring the vehicle into motion at higher starting gears, since a higher torque is available at a low combustion engine speed. Bringing the vehicle into motion at higher gears also entails that the number of shift operations to be carried out until the desired speed is achieved may be reduced. When driving a vehicle with a large number of starts and stops, such as bus traffic, the ride comfort of the driver and the passengers is impacted favourably if a large number of shift operations may be avoided.

When the vehicle is brought into motion with only the electric machine, the wear on the clutch and the fuel consumption are reduced, since the kinetic energy stored in the energy storage device can be returned to the electric machine.

According to one embodiment of the invention, the coupling device is a friction clutch which is partly engaged, so that at least a certain part of the available torque from the combustion engine is supplied to the input shaft in the gearbox. This means that the combustion engine and the electric machine jointly supply torque to the input shaft in the gearbox. This is needed if the requested torque exceeds the maximum torque that the electric machine is able to deliver.

According to another embodiment, the rotational speed in the respective shaft is detected with a first speed sensor arranged at the input shaft and a second speed sensor arranged at the output shaft. Thus, the hybrid powertrain may be controlled against a background of information about the rotational speed of the input and output shafts of the gearbox.

The objectives stated above are also achieved with a hybrid powertrain and a vehicle according to the enclosed claims.

Additional advantages of the invention are set out in the detailed description below.

BRIEF DESCRIPTION OF THE DRAWINGS

Below is a description, as an example, of preferred embodiments, with reference to the enclosed drawings, in which.

DETAILED DESCRIPTION OF THE INVENTION

Figure 1:
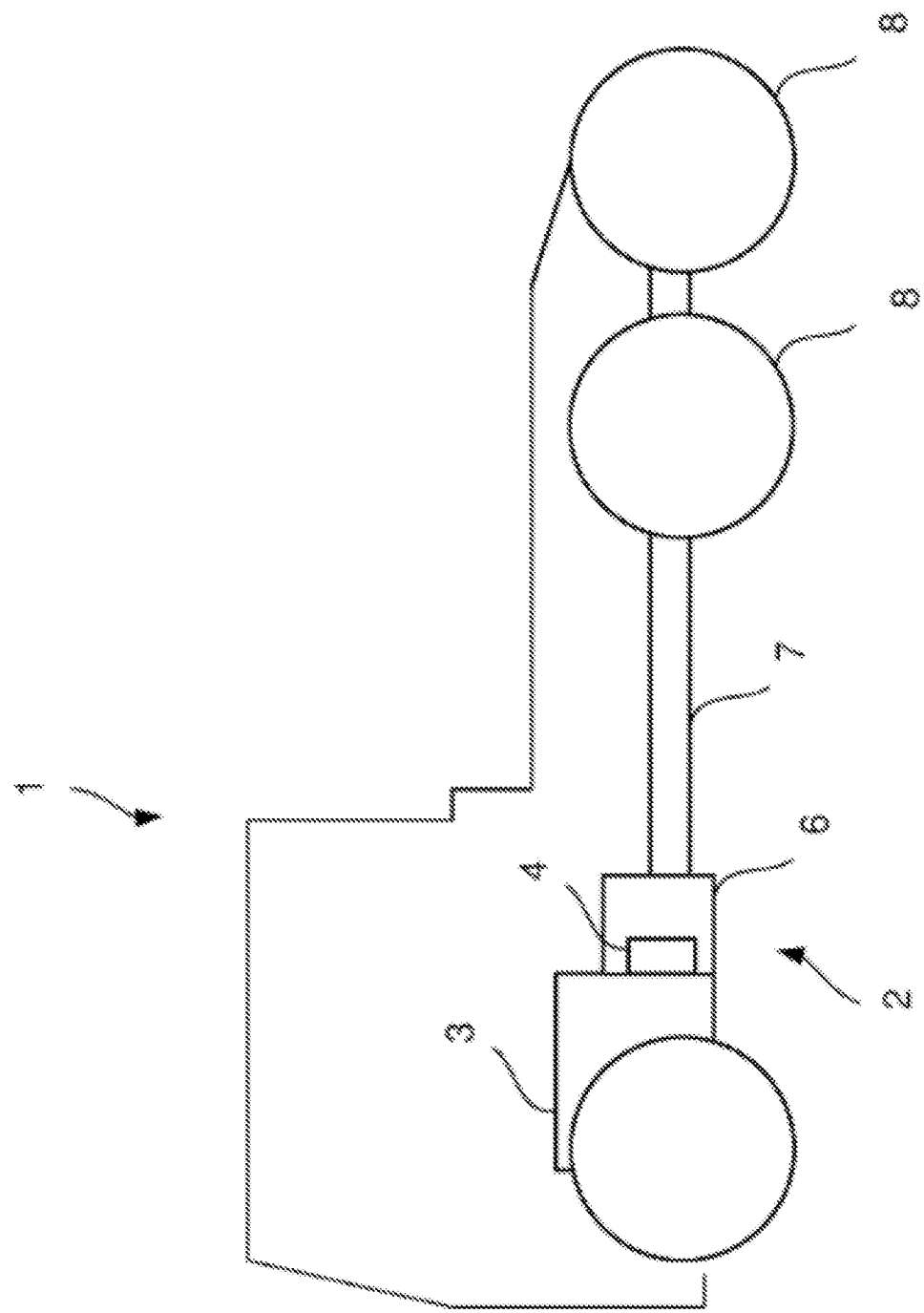
FIG. 1 shows a schematic side view of a vehicle with a hybrid powertrain according to one embodiment.

FIG. 1 shows a schematic side view of a vehicle 1, comprising a hybrid powertrain 2 with a combustion engine 3 and an electric machine 4, which are connected to a gearbox 6. The gearbox 6 is also connected to the driving wheels 8 of the vehicle 1 via a propeller shaft 7.

Figure 2:
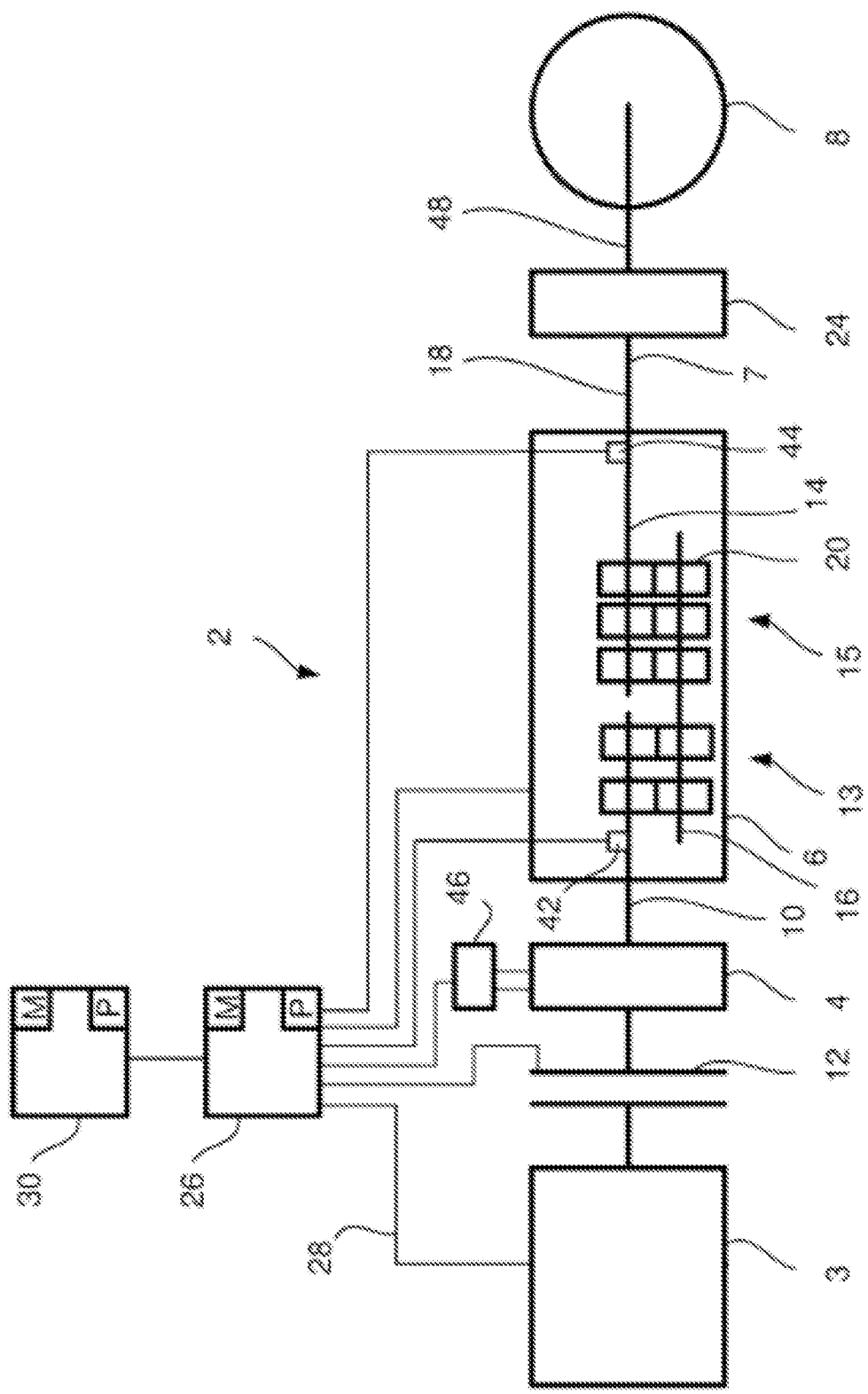
FIG. 2 shows a schematic side view of a hybrid powertrain according to one embodiment.

FIG. 2 shows a schematic view of a hybrid powertrain 2, comprising a combustion engine 3 and an electric machine 4, which are connected to an input shaft 10 of the gearbox 6. The combustion engine 3 may be connected to and disconnected from the input shaft 10 via a coupling device 12, which may be manually and/or automatically manoeuvrable. The gearbox 6 may be an automated manual transmission (AMT) of a split type and comprises a split gear unit 13 and a main gear unit 15. The split gear unit 13 connects an input shaft 10 with a countershaft 16. The main gear unit 15 connects the countershaft 16 with a main shaft 14, which is connected with an output shaft 18 from the gearbox. On the input shaft 10, the countershaft 16 and the main shaft 14, one or several transmission elements 20 in the form of cogwheels and pinions are arranged, connecting the respective shafts 10, 16, 14. In this context, it should be noted that the gearbox may be another type of gearbox. A first speed sensor 42 may be arranged at the input shaft 10 to detect the rotational speed of the input shaft 10 and a second speed sensor 44 may be arranged at the output shaft 18 to detect the rotational speed of the output shaft 18. The output shaft 18 is connected to the propeller shaft 7, which is connected to a final gear 24, which in turn is connected to the driving wheels 8 of the vehicle 1 via a driving shaft 48. An electronic control device 26 is connected to at least one of the combustion engine 3, the coupling device 12, the electric machine 4, the gearbox 6 and/or the speed sensors 42, 44 via electrical conductors 28. An energy storage device 46 for the electric machine 4 may be connected, via conductors, to the electric machine 4, and connected to the electronic control device 26. The energy storage device 46 may consist of an electric accumulator. Instead of transmitting signals through the electrical conductors 28, signals may be transmitted wirelessly between the electronic control device 26 and the combustion engine 3, the coupling device 12, the electric machine 4, the gearbox 6, and the speed sensors.

The electronic control device 26 may comprise a memory M and a computer program P. It is also possible to connect a computer 30 to the control device 26.

Figure 3:
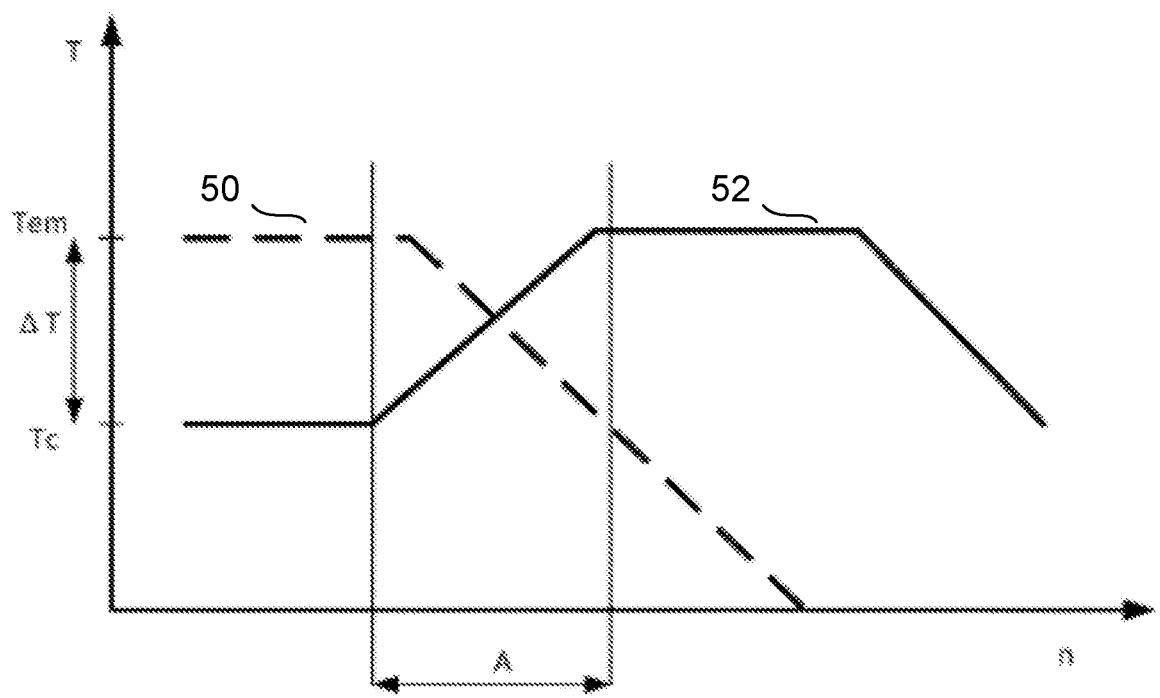
FIG. 3 shows a diagram of torque in relation to engine speed for a hybrid powertrain in a vehicle according to one embodiment.

FIG. 3 shows a diagram of torque T in relation to engine speed n in a vehicle 1 with a hybrid powertrain 2 according to one embodiment. The dashed graph 50 in FIG. 3 illustrates that the electric machine 4 is able to generate its maximum torque $T_{em}$ already at a low rotational speed n. The solid graph 52 represents the driving torque of the combustion engine 3, which, at low engine speeds, may generate a significantly lower torque $T_c$ compared to the electric machine 4. The difference between the electric machine's 4 maximum available torque $T_{em}$ and the combustion engine's 3 maximum available torque $T_c$ at low engine speeds is indicated with $\Delta T$ in FIG. 3. When the combustion engine's 3 rotational speed increases, the available torque from the combustion engine 3 increases. FIG. 3 shows how the combustion engine's 3 torque increases substantially linearly in the speed range area A, achieving the maximum available torque at the end of the speed range area A. The greater the reaction torque met by the combustion engine 3, the longer it takes for the combustion engine to achieve its maximum torque while the speed range area A remains constant.

Figure 4:
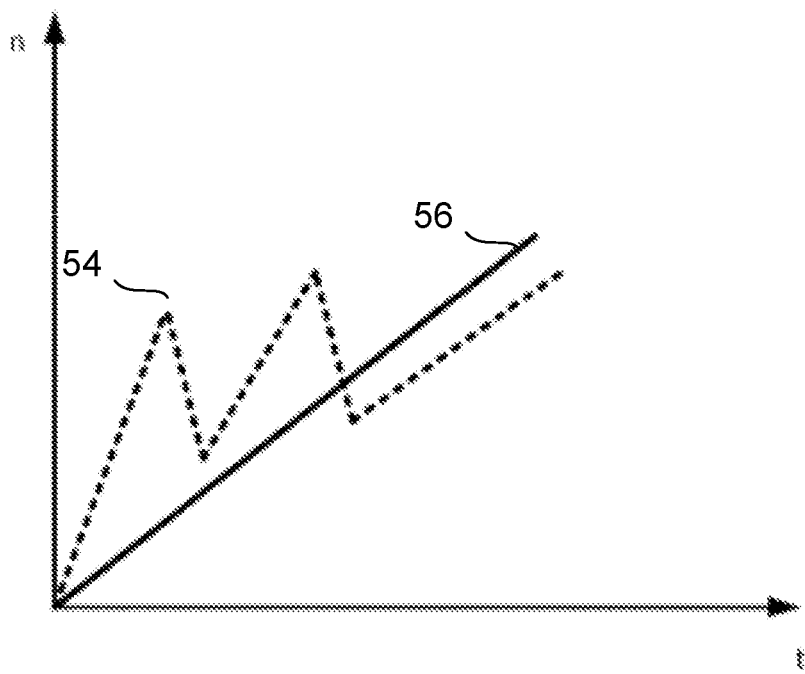
FIG. 4 shows a diagram of engine speed in relation to time lapsed for a hybrid powertrain in a vehicle according to one embodiment.

FIG. 4 shows a diagram of rotational speed n of the input shaft 10 to the gearbox 6 in relation to time lapsed t, for a hybrid powertrain 2 in a vehicle 1 according to one embodiment. The dashed graph 54 shows a number of shift operations being carried out in the gearbox 6 with a starting gear engaged. This means that the rotational speed n will vary during the start process. The solid graph 56 shows how the rotational speed n of the input shaft 10 according to one embodiment carries substantially linearly during the start process when the vehicle 1 is started with a higher gear engaged in the gearbox. This means that the hybrid powertrain 2 may allow for a reduced fuel consumption, less wear on the clutch and an improved ride comfort for the driver and the passengers.

Figure 5A:
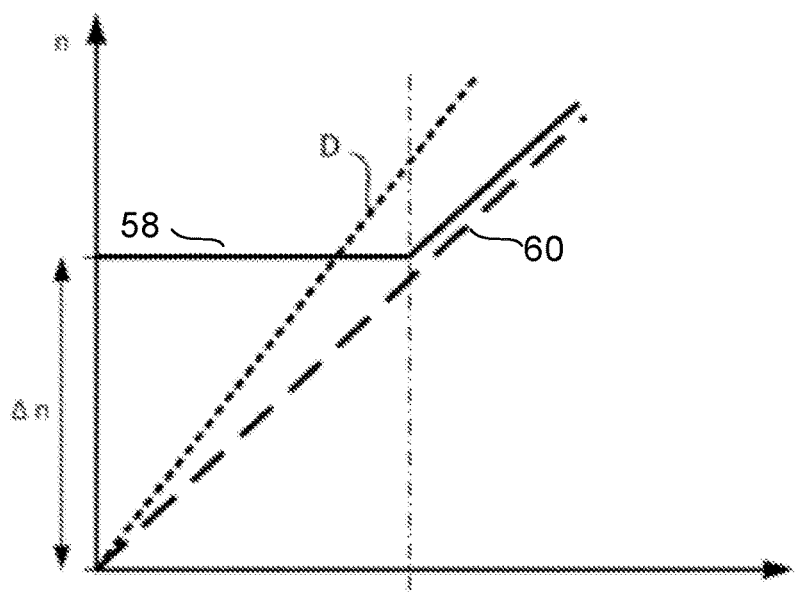
FIG. 5a shows a diagram of engine speed in relation to time lapsed for a hybrid powertrain in a vehicle according to one embodiment.

FIG. 5a shows a diagram of rotational speed n of the input shaft 10 to the gearbox 6 in relation to time lapsed t, for a hybrid powertrain 2 in a vehicle 1 according to one embodiment. The graph with the solid line 58 shows the rotational speed of the combustion engine 3 during a start process. Before the vehicle 1 is set into motion, the combustion engine 1 is preferably operated at idling speed and the clutch 12 is open, so that the combustion engine 1 does not exert a torque on the input shaft 10 of the gearbox 6. To set the vehicle 1 into motion, energy E is supplied from the energy storage device 46 to the electric machine 4, which entails that the electric machine 4 will exert a torque on the input shaft 10. The vehicle 1 then starts to roll. The rotational speed of the electric machine 4, which has increased substantially linearly, is illustrated with a dashed line 60 in FIG. 5a. When the rotational speed of the electric machine 4 substantially coincides with the rotational speed of the combustion engine 3, the clutch 12 is closed, wherein the rotational speed of the combustion engine 3 increases to make the vehicle 1 travel at the desired speed. Since the electric machine 4 is connected in series with the combustion engine 3, the electric machine's 4 rotational speed will be equivalent to the combustion engine's 3 rotational speed. Depending on the operating conditions, the supply of energy to the electric machine 4 will cease, however, when the combustion engine 3 is connected, entailing that the electric machine 4 no longer exerts a torque on the input shaft 10. During the start, in a speed range area where the combustion engine 3 has a low available torque, the electric machine's 4 torque may however need to be available throughout the entire start process, that is to say until the combustion engine 3 delivers the maximum available torque.

To be able to complete an electric start with the electric machine 4 and with a high gear engaged, there is a control function to determine how much energy $E_{el}$ is available in the energy storage device 46. This means it is possible to ensure that the start is carried out solely with the electric machine 4. The determination is carried out by way of estimating the energy $E_k$ required to set the vehicle 1 into motion with a certain acceleration, to reach the speed where the combustion engine 3 takes over the operation of the vehicle 1 from the electric machine 4. To make the start gear selection more robust, an estimated energy amount $E_m$ is added to the energy $E_k$, which addition corresponds to the amount of energy required by the vehicle 1 before actually moving off, which may involve start-up of the combustion engine 3 and the case where the vehicle 1 is driven solely by the electrical machine 4 at a low speed.

The energy $E_{el}$ that must be available in the energy storage device 46 to complete an electric start with a high gear must thus fulfil the condition:

$$E_{el} > E_k + E_m \qquad [1]$$

If the energy $E_{el}$ in the energy storage device 46 does not fulfil the condition, a lower starting gear is selected. This ensures that as high a starting gear as possible, allowing for a full electric start with the electric machine 4, may be used.

The start process described in connection with FIG. 5a is carried out with a starting gear in the gearbox 6, which starting gear is higher than the gear at which the combustion engine's torque at idling speed is able to operate the input shaft 10. The line D, consisting of dots in FIG. 5a represents the rotational speed increase that would arise with the lowest gear engaged. Thus, the electric machine 4 would achieve the same rotational speed as the combustion engine 3 at an earlier point in time compared to if a higher gear were engaged, which would entail a larger number of shift operations in the gearbox 6 to achieve the requested target engine speed and speed of the vehicle 1.

Figure 5B:
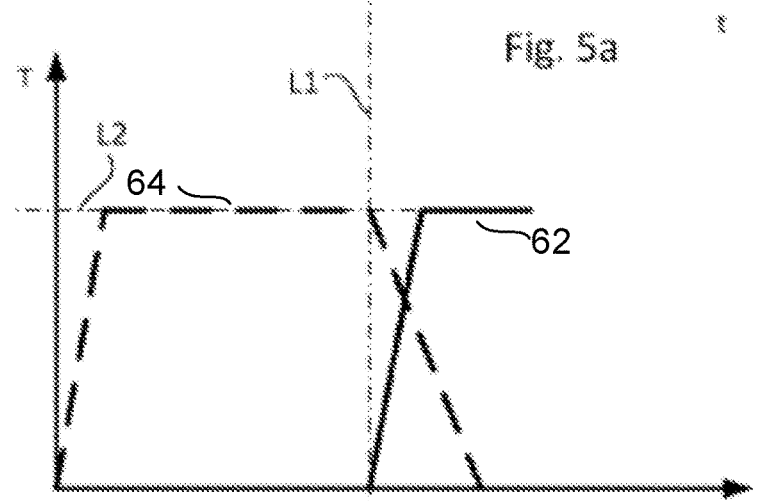
FIG. 5b shows a diagram of torque in relation to lapsed time for a hybrid powertrain in a vehicle according to one embodiment.

FIG. 5b shows a diagram of the torque T in the combustion engine 3, illustrated with a solid line 62, and the electric machine 4, with a dashed line 64, in relation to time lapsed t, in a vehicle 1 with a hybrid powertrain 2 according to a first operating condition. If the electric machine's 4 maximum available torque exceeds a requested torque from the vehicle driver, the torque required to set the vehicle 1 in motion may be supplied in full by the electric machine 4. To set the vehicle 1 into motion, only the torque from the electric machine 4 acts on the input shaft 10 to the gearbox 6. When the clutch 12 is closed, which occurs at a point in time indicated by the vertical dotted line L1 in FIG. 5b, the combustion engine's 3 torque acts on the input shaft 10. At the point in time t for the connection of the combustion engine 3, the electric machine 4 ceases to exert a torque on the input shaft 10. The combustion engine 3 is then controlled to a torque requested by the vehicle driver, which corresponds to the torque indicated by the horizontal dotted line L2 in FIG. 5b. It is also apparent that the electric machine's 4 and the combustion engine's 3 torque during the start process will jointly display substantially plane torque curve, which coincides with the horizontal dotted line L2.

Figure 5C:
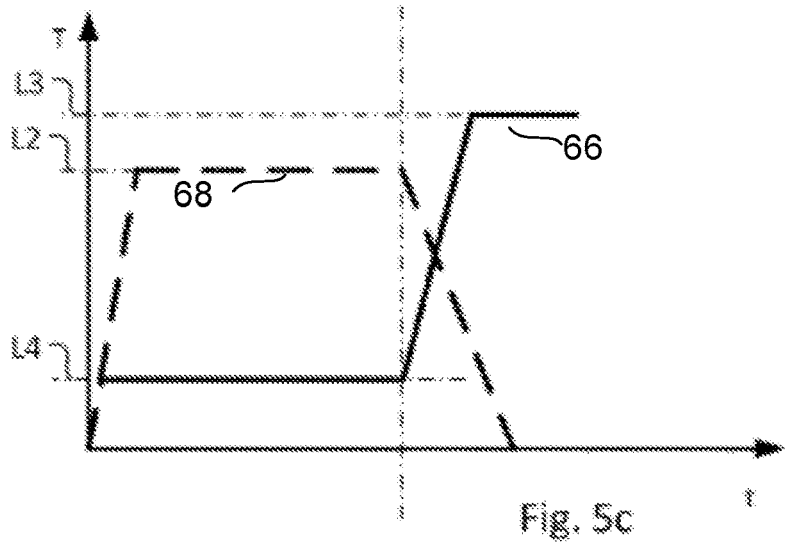
FIG. 5c shows a diagram of torque in relation to time lapsed for a hybrid powertrain in a vehicle according to one embodiment.

FIG. 5c shows a diagram of the torque T in the combustion engine 3, illustrated with a solid line 66, and the electric machine 4, with a dashed line 68, in relation to time lapsed t, for a hybrid powertrain 2 in a vehicle according to a second operating condition. If the electric machine's 4 maximum available torque is below a requested torque from the vehicle driver, the electric machine 1 alone cannot provide the torque required to set the vehicle 1 into motion. Instead, the combustion engine 3 must assist in setting the vehicle 1 into motion, by way of the clutch 12 partly closing and supplying torque to the input shaft 10 with a sliding clutch 12. The torque requested by the driver is indicated with the horizontal dotted line L3 in FIG. 5c. The torque supplied by the combustion engine 3 with a sliding clutch 12 is indicated with the horizontal dotted line L4 in FIG. 5c. The electric machine's 4 and the combustion engine's 3 total torque will therefore be equivalent to the torque requested by the driver. When the combustion engine 3 is connected, the electric machine 4 ceases to exert a torque on the input shaft 10, wherein the combustion engine 3 instead takes over the task of exerting torque on the input shaft 10. The combustion engine 3 is then controlled to a torque requested by the vehicle driver, which is equivalent to the torque indicated by the horizontal dotted line L3 in FIG. 5b.

Figure 6:
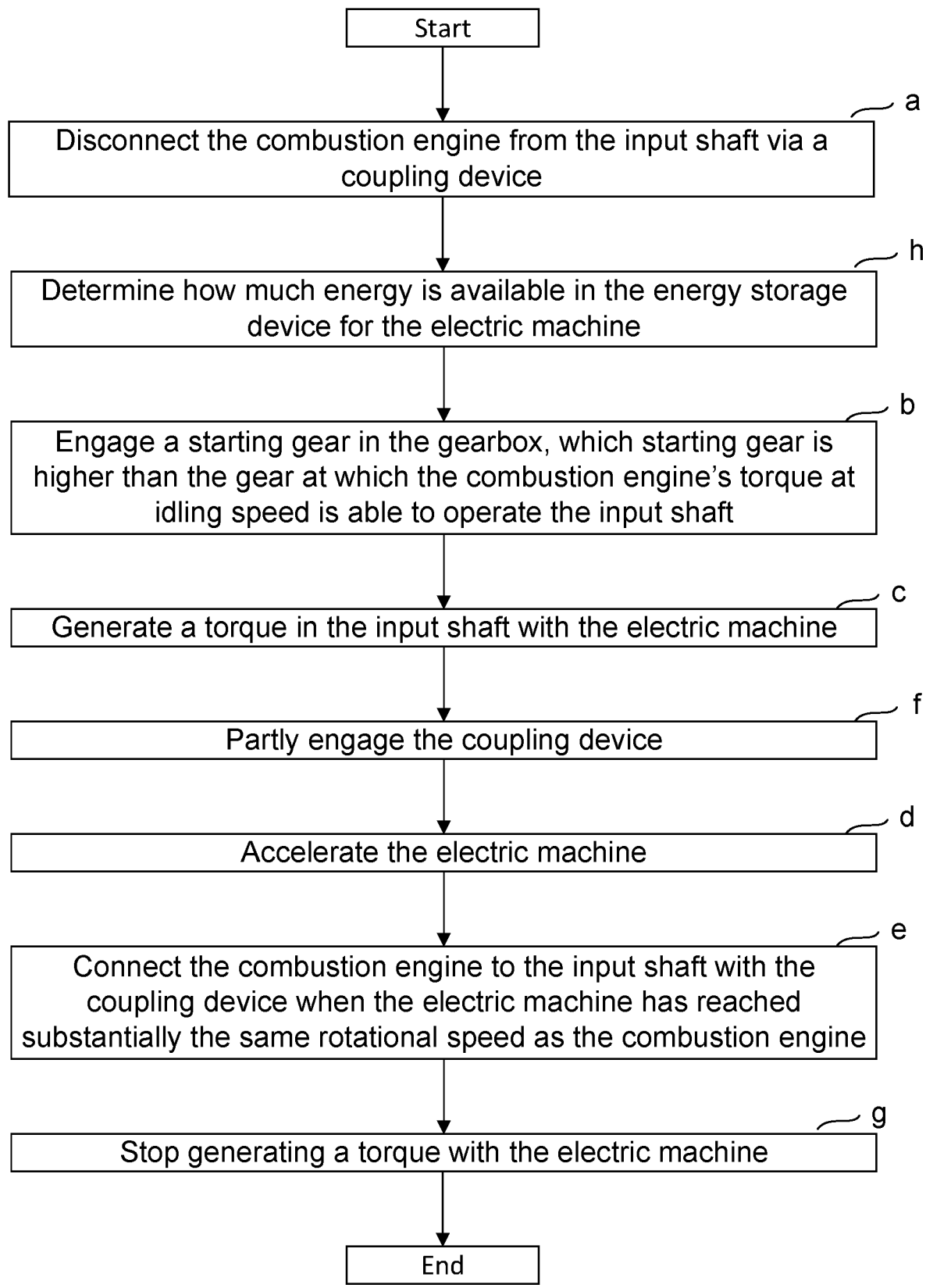
FIG. 6 shows a flow chart of a method to control a hybrid powertrain according to one embodiment.

FIG. 6 shows a flow chart of a method to control a hybrid powertrain. The method comprises the following steps:

a) disconnecting the combustion engine 3 from the input shaft 10 via a coupling device 12, b) engaging a starting gear in the gearbox 6, which starting gear is higher than the gear at which the combustion engine's 3 torque at idling speed is able to operate the input shaft 10, c) generating a torque in the input shaft 10 with the electric machine 4, d) accelerating the electric machine 4, and e) connecting the combustion engine 3 to the input shaft 10 with the coupling device 12 when the electric machine 4 has reached substantially the same rotational speed as the combustion engine 3.

According to one embodiment of the invention, the coupling device 12 is a friction clutch, and between steps c) and d) the coupling device 12 is partly engaged at a step f), so that at least a certain part of available torque from the combustion engine 3 is supplied to the input shaft 10.

The method also comprises the additional step, after step e):

g) stop generating a torque with the electric machine 4.

Between the steps a) and b), at step h), it is determined how much energy $E_{el}$ is available in the energy storage device 46 for the electric machine 4.

At step b) the gear selection may be determined by the amount of energy $E_{el}$ available in the energy storage device 46.

The rotational speed of the respective shafts 10, 18 may be detected with a first speed sensor 42 arranged at the input shaft 10, and a second speed sensor 44 arranged at the second shaft 18.

According to the invention, a computer program P is provided, which may comprise procedures to control a hybrid powertrain 2 according to the present invention.

The computer program P may comprise procedures for control of a hybrid powertrain 2 according to the method steps specified above.

The program P may be stored in an executable manner, or in a compressed manner, in a memory M and/or a read/write memory R.

The invention also relates to a computer program product, comprising program code stored in a medium readable by a computer 30, to perform the method steps specified above, when said program code is executed in the electronic control device 26, or in another computer 30 connected to the control device 26. Said program code may be stored in a non-volatile manner on said computer-readable medium.

The components and features specified above may, within the framework of the invention, be combined between different embodiments specified.

The invention claimed is:

1. A method to control a hybrid powertrain, comprising a combustion engine, an electric machine, a gearbox with an input shaft and an output shaft, wherein the combustion engine and the electric machine are connectable to the input shaft of the gearbox, and a coupling device configured for connecting and disconnecting the combustion engine from the input shaft of the gearbox, wherein the method comprises:

a) disconnecting the combustion engine from the input shaft of the gearbox via the coupling device;

b) selecting a starting gear in the gearbox, where the starting gear is a gear having a lower gear ratio than a gear ratio at which the combustion engine's torque at idling speed is able to sufficiently rotate the input shaft of the gearbox;

c) engaging the selected starting gear in the gearbox;

d) while the combustion engine is idling and not connected to the input shaft of the gearbox, connecting or ensuring that the electric machine is connected to the input shaft of the gearbox and thereafter control the electric machine to generate a torque in the input shaft of the gearbox using the electric machine;

e) accelerating the electric machine, thereby accelerating rotation of the input shaft of the gearbox; and f) when the input shaft of the gearbox, in the selected starting gear, is rotating at substantially the same speed as a rotational speed of the combustion engine, connecting the combustion engine to the input shaft of the gearbox using the coupling device to thereafter drive the input shaft of the gearbox with torque from the combustion engine, whereby using the electric machine to drive the input shaft of the gearbox at the selected starting gear with the lower gear ratio up to a rotating speed of the combustion engine prior to connecting the combustion engine to the input shaft of the gear box thereby reduces a number of gear shifts required to bring the vehicle up to a selected speed.

2. A method according to claim 1, wherein the coupling device is a friction clutch, and wherein said method comprises between steps d) and e): step g) connecting the coupling device, so that at least a part of the available torque from the combustion engine is supplied to the input shaft.

3. A method according to claim 1, wherein, after step f):

h) stop generating a torque with the electric machine.

4. A method according to claim 1, wherein said method comprises between steps a) and b): step i) determining an amount of energy available in an energy storage device for the electric machine.

5. A method according to claim 4, wherein step b) further comprises selection of which gear ratio to use as the starting gear based on the amount of energy available in the energy storage device.

6. A method according to claim 1, wherein a rotational speed of the input shaft is detected with a first speed sensor arranged at the input shaft, and a rotational speed of the output shaft is detected with a second speed sensor arranged at the output shaft.

7. A hybrid powertrain comprising:

a combustion engine;

an electric machine;

a gearbox with an input shaft and an output shaft, wherein the combustion engine and the electric machine are connectable to the input shaft of the gearbox;

a coupling device configured for connecting and disconnecting the combustion engine from the input shaft of the gearbox; and a control device configured to:

disconnect the combustion engine from the input shaft of the gearbox via the coupling device;

select a starting gear in the gearbox, wherein the starting gear is a gear having a lower gear ratio than a gear ratio at which the combustion engine's torque at idling speed is able to sufficiently rotate the input shaft of the gearbox;

control the gearbox to engage the selected starting gear in the gearbox;

while the combustion engine is idling and not connected to the input shaft of the gearbox, connect or ensure that the electric machine is connected to the input shaft of the gearbox and thereafter control the electric machine to generate a torque in the input shaft of the gearbox using the electric machine;

control the electric machine to accelerate thereby accelerating rotation of the input shaft of the gearbox; and when the input shaft of the gearbox, in the selected starting gear, is rotating at substantially the same speed as a rotational speed of the combustion engine, control the coupling device to connect the combustion engine to the input shaft of the gearbox to thereafter drive the input shaft of the gearbox with torque from the combustion engine, whereby using the electric machine to drive the input shaft of the gearbox at the selected starting gear with the lower gear ratio up to a rotating speed of the combustion engine prior to connecting the combustion engine to the input shaft of the gear box thereby reduces a number of gear shifts required to bring the vehicle up to a selected speed.

8. A vehicle comprising a hybrid powertrain comprising:
a combustion engine;
an electric machine;
a gearbox with an input shaft and an output shaft, wherein the combustion engine and the electric machine are connectable to the input shaft of the gearbox;
a coupling device configured for connecting and disconnecting the combustion engine from the input shaft of the gearbox; and
a control device configured to:
disconnect the combustion engine from the input shaft of the gearbox via the coupling device;
select a starting gear in the gearbox, wherein the starting gear is a gear having a lower gear ratio than a gear ratio at which the combustion engine's torque at idling speed is able to sufficiently rotate the input shaft of the gearbox;
control the gearbox to engage the selected starting gear in the gearbox;
while the combustion engine is idling and not connected to the input shaft of the gearbox, connect or ensure that the electric machine is connected to the input shaft of the gearbox and thereafter control the electric machine to generate a torque in the input shaft of the gearbox using the electric machine;
control the electric machine to accelerate thereby accelerating rotation of the input shaft of the gearbox; and
when the input shaft of the gearbox, in the selected starting gear, is rotating at substantially the same speed as a rotational speed of the combustion engine, control the coupling device to connect the combustion engine to the input shaft of the gearbox to thereafter drive the input shaft of the gearbox with torque from the combustion engine, whereby using the electric machine to drive the input shaft of the gearbox at the selected starting gear with the lower gear ratio up to a rotating speed of the combustion engine prior to connecting the combustion engine to the input shaft of the gear box thereby reduces a number of gear shifts required to bring the vehicle up to a selected speed.

9. A computer program product comprising computer program code stored on a non-transitory computer-readable medium, said computer program product for controlling a hybrid powertrain, comprising a combustion engine, an electric machine, a gearbox with an input shaft and an output shaft, wherein the combustion engine and the electric machine are connectable to the input shaft of the gearbox, and a coupling device configured for connecting and disconnecting the combustion engine from the input shaft of the gearbox, said computer program product comprising computer instructions to cause said at least one control unit to perform the following operations:
a) disconnect the combustion engine from the input shaft of the gearbox via the coupling device;
b) select a starting gear in the gearbox, wherein the starting gear is a gear that comprises a lower gear ratio than a gear ratio at which the combustion engine's torque at idling speed is able to sufficiently rotate the input shaft of the gearbox;
c) control the gearbox to engage the selected starting gear in the gearbox;
d) while the combustion engine is idling and not connected to the input shaft of the gearbox, connect or ensure that the electric machine is connected to the input shaft of the gearbox and thereafter control the electric machine to generate a torque in the input shaft of the gearbox using the electric machine;
e) control the electric machine to accelerate, thereby accelerating rotation of the input shaft of the gearbox; and
f) when the input shaft of the gearbox, in the selected starting gear, is rotating at substantially the same speed as a rotational speed of the combustion engine, control the coupling device to connect the combustion engine to the input shaft of the gearbox to thereafter drive the input shaft of the gearbox with torque from the combustion engine, whereby using the electric machine to drive the input shaft of the gearbox at the selected starting gear with the lower gear ratio up to a rotating speed of the combustion engine prior to connecting the combustion engine to the input shaft of the gear box thereby reduces a number of gear shifts required to bring the vehicle up to a selected speed.

10. A computer program product according to claim 9, wherein the coupling device is a friction clutch, and wherein said computer program product further comprises computer instructions to cause said at least one control unit to, between operations d) and e), the operation g) connect the coupling device, so that at least a part of the available torque from the combustion engine is supplied to the input shaft.

11. A computer program product according to claim 9, wherein said computer program product further comprises computer instructions to cause said at least one control unit to, after operation f), operation h) stop generating a torque with the electric machine.

12. A computer program product according to claim 9, wherein said computer program product further comprises computer instructions to cause said at least one control unit to, between operations a) and b), operation i) determining an amount of energy available in an energy storage device for the electric machine.

13. A computer program product according to claim 12, wherein operation b) further comprises selection of which gear ratio to use as the starting gear based on the amount of energy available in the energy storage device.

\* \* \* \* \*